Oct. 9, 1928.
1,687,229
F. RIEDEL
APPARATUS FOR UTILIZING IMPURE GASES OR EXHAUST GASES
CONTAINING CARBON DIOXIDE
Filed March 8, 1922
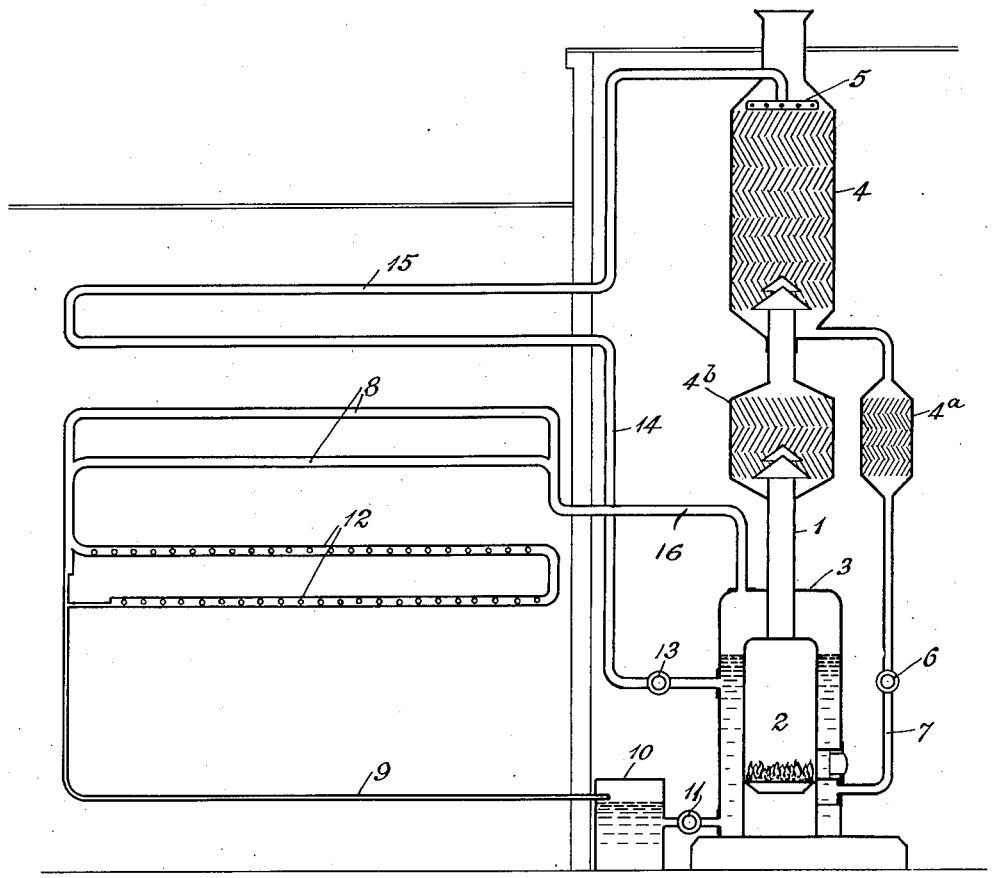
WITNESS:
INVENTOR
FRIEDRICH RIEDEL
BY
ATTORNEYS Patented Oct. 9, 1928.

1,687,229

UNITED STATES PATENT OFFICE.

FRIEDRICH RIEDEL, OF ESSEN, GERMANY, ASSIGNOR TO RIEDEL FERTILIZING PROCESS CO., INC., OF ELIZABETH, NEW JERSEY, A CORPORATION OF NEW JERSEY.

APPARATUS FOR UTILIZING IMPURE GASES OR EXHAUST GASES CONTAINING CARBON DIOXIDE.

Application filed March 8, 1922, Serial No. 542,149, and in Germany May 14, 1916.

Although it is known that any increase of carbon dioxide in the air has an advantageous effect on the growth of plants, every endeavor is made to prevent combustion gases escaping through cracks in the smoke passages installed in hothouses and thus getting access to the plants, as experience has shown that the plants suffer.

Besides solid particles, such as dust, soot, etc., combustion gases contain small quantities of gases injurious to plant life, such as sulphur dioxide, hydrocarbons and the like, the former of which is greatly harmful to plant tissue. Purification of these gases has never been considered. I have heretofore found, however, that combustion gases, when purified, are of the greatest utility for the purpose of increasing and assisting the growth of plants.
For highly impure gases the method of purifying would be somewhat involved until all the constituents have been removed one after the other.

The invention proposes not to purify the combustion gases as a whole, but only to extract the carbon dioxide contained therein and to subject the same to a further process for the purpose of removing any traces of harmful matter which may not have been entirely separated.

The extraction of the carbon dioxide from the combustion gases may be effected by the use of aqueous solutions of carbonates of the alkali metals which possess the quality of absorbing carbon dioxide and thereby being converted at normal temperature into bicarbonate while, on being subjected to heat, liberating carbon dioxide and becoming reconverted into the original chemical form.
While the carbon dioxide may be chemically separated from the other gases in this manner, it is still possible that small quantities of the latter are mechanically retained during the washing process, pass into the bicarbonate solution and then mix again with the carbon dioxide.

Small quantities of hydrocarbons are not very harmful to plant life, but even small traces of sulphur dioxide are harmful.
One feature of this invention is, therefore, to neutralize the sulphur dioxide by additions, (for example, soda lye), to the solution of bicarbonate of sodium.

The supply and distribution of the carbon dioxide may, for instance, be effected by means of a mechanically-driven bellows and pipes. The distribution of the comparatively small quantities of carbon dioxide in this concentrated form would not be uniform.

This drawback may be avoided and certain advantages gained if the supply is carried out, as hereinafter described, under the relatively gentle expansive force of gases and vapors produced by evaporation and free from pulsating or high pressure impulses such as are produced by mechanically driven bellows or the like.

According to the invention, the solution of bicarbonate is heated until the steam given off is raised to a pressure sufficient to carry along the now rarefied carbon dioxide. As the gas is now ready for use for plant culture, this mixture of carbon dioxide and steam may be let into the conservatory which it is desired to treat with gas; if, however, a drier carbon dioxide is desired, the expulsion of the gas from the pipe is allowed only after the steam has been cooled and precipitated.

The simultaneous production of water vapor has an additional advantage. If any small quantity of sulphur dioxide should pass into the pipes, which may happen if the neutralizer in the boiler is consumed or for any other reason, the presence of the steam will prevent its expulsion from the pipe.

The propensity of sulphur dioxide in the presence of water is to become converted into sulphurous acid, and consequently it will be precipitated with the water vapor, dissolve and be carried off with the condensed water. The carbon dioxide which will be expelled from the pipe is perfectly pure and clean; in any case, the effect of the wider distribution is to reduce any small traces of poisonous constituents to an absolutely harmless quantity. By this method even fuel or combustion gases containing a very large amount of sulphur may produce perfectly pure and clean carbon dioxide, which may safely be used for botanical purposes, a perfectly pure carbon dioxide gas having access to the air surrounding the plants being assured, which is not harmful to plant life but assists the growth of the plants.

The carrying forward of the carbon dioxide by means of steam also allows, in installations where heating is required, the production of steam to be increased and the arising mixture of carbon dioxide and steam to be used for the purpose of heating the conservatory.

The object of the invention is to provide a simple apparatus whereby the purposes and features hereinbefore set forth may be efficiently carried out and attained.

An example of the invention is shown in the accompanying drawing, which shows one form of installation as used in a conservatory.

Above the outlet pipe 1 of the furnace 2, of the vessel or boiler 3, an absorber or irrigating tower 4 is placed containing a filling material having a large surface. By means of the distributing pipe 5 a solution of alkali (sodium or potassium) carbonate at normal temperature is caused to trickle down upon the filling material and therefore has ample opportunity to absorb the carbon dioxide from the combustion gases rising to meet it. Unabsorbed constituents of the combustion gases escape freely into the air. By the absorption of the carbon dioxide a bicarbonate solution is obtained.

The bicarbonate solution obtained in the irrigating tower 4 is passed from said irrigating tower 4 into the boiler 3 through the connection 4ª, 6 and 7, in which 4ª represents a filtering element, 6 a pump, and 7 the return pipe leading from the pump to the boiler.

In order to keep back any solids, such as dust, soot and the like, the solution is first passed through a filter 4ª and then conducted through the return pipe or conduit 7 into the boiler vessel 3; in the preferred arrangement a pump 6 is utilized to force the solution into said boiler 3. The pump 6, and also the pumps 13 and 11 hereinafter referred to, are controlled to maintain a more or less constant level of fluid in the boiler 3.

The method by which pure carbon dioxide is obtained and carried off has been explained above. In the case above described the mixture of carbon dioxide and steam generated in the boiler is also utilized for the purpose of heating the conservatory.

The mixed vapors evolved in the boiler vessel 3 pass off through a discharge passage, conduit, or connection 16 which leads to discharge pipes 8. The water which, by condensation in the discharge pipes 8, is precipitated, is led off through the pipe 9 into a tank 10, where any small quantity of sulphurous acid is neutralized, and is then forced by means of the pump 11 into the boiler 3.

Where the steam commences to condense, the upper part of the discharge pipes 12 are provided with a number of small holes, which allow the carbon dioxide to escape into the air which envelops the plants and gives it access to the plants. Any escaping steam must be compensated for by additions to the feed water.

By the heating of the bicarbonate solution and the consequent separation of the carbon dioxide, the former returns to its original chemical composition of carbonate solution and consequently becomes capable of again absorbing carbon dioxide.

For the purpose of utilizing this solution again, it is drawn off by means of a pump 13, from below the water line of the solution contained in the boiler 3, and led through the feed conduit pipe 14 to the distributing pipe 5, and the same cycle of operation recommences.

As a cool solution has a greater power of absorption, it is necessary to cool it down, for which reason it must pass through the cooling pipe or feed conduit 15 which may, at the same time, be used for heating purposes.

It is advantageous to pass the combustion gases into the absorber cooled down as much as possible, so that the solvent is evaporated as little as possible and there is the largest degree possible of absorption of carbon dioxide. If required, the necessary draught for the furnace may be obtained by placing a bellows in the exhaust. In order to avoid faults, one should, of course, use a furnace free of smoke and soot. There is no reason why the described method of obtaining pure carbon dioxide for botanical purposes may not be used in the case of other noxious carbon dioxide-containing gases of any kind. This invention covers the use of other equally effective salt solutions in place of the alkali metal carbonates mentioned.

By means of the described apparatus, hitherto useless and wasted quantities of carbon dioxide from noxious fumes of any description, are utilized for the preservation and increase of plants in a most simple manner whereby the absolute purity of the carbon dioxide is guaranteed with the greatest security and economy.

In some cases, it may be desirable to also locate a filter 4ᵇ in the pipe 1 between the boiler 3 and the absorber 4; this filter may be washed with the water in the customary manner so that, on the one hand, the combustion gases will be cooled and on the other hand dust, soot and the like is removed therefrom.

The present application is a continuation in part of another application filed by me in the United States Patent Office on August 24, 1920, Serial No. 405,763, now Patent No. 1,458,595, issued June 12, 1923.

Various modifications in the specific form shown and described may be made within the scope of the claims without departing from the spirit of my invention.

I claim:

1. An apparatus of the character described, comprising a heating plant heated by ignited carbonaceous fuel, a vessel adapted to be uniformly heated by said plant to cause a continuous evolution of gas and vapor from the liquid contents of said vessel, the vessel being further adapted to contain an alkaline solution, means for introducing products of combustion of the said fuel to the alkaline solution and a conduit leading from said vessel at a point above the level of said solution to the vicinity of growing plants and there provided with a plurality of orifices, said conduit being unobstructed so as to discharge near such plants and solely under the relatively gentle expansive force of the gases and vapors produced by evaporation in said vessel, carbon dioxide produced in said vessel by the heating of said solution.

2. An apparatus of the character described, comprising a furnace heated by ignited carbonaceous fuel, an outlet pipe for the products of combustion of said furnace, an irrigating tower in communication with said outlet pipe, a vessel adapted to be heated by said furnace, a feed conduit for passing an alkaline solution from said vessel into said tower to enable the solution to absorb carbon dioxide contained in said combustion products, means for returning said carbon dioxide-containing solution to the vessel, and a discharge conduit leading from a point above the level of the liquid in said vessel and there provided with orifices, said conduit being unobstructed so as to discharge, in the vicinity of growing plants and solely under the relatively gentle expansive force of the gases and vapors produced by evaporation in said vessel, the carbon dioxide produced by the heating of the solution in said vessel.

3. An apparatus of the character described, comprising a furnace heated by ignited carbonaceous fuel, an outlet pipe for the products of combustion of said furnace, an irrigating tower in communication with said outlet pipe, a vessel adapted to be heated by said furnace, a feed conduit for passing an alkaline solution from said vessel into said tower to enable the solution to absorb carbon dioxide contained in said combustion products, a return conduit for returning said carbon dioxide-containing solution to said vessel, a filter interposed in said return conduit, and means for distributing, in the vicinity of growing plants and solely under the relatively gentle expansive force of the gases and vapors produced by evaporation in said vessel, the carbon dioxide produced by the heating of the solution in said vessel.

4. An apparatus of the character described, comprising a furnace heated by ignited carbonaceous fuel, an outlet pipe for the products of combustion, an irrigating tower in communication with said outlet pipe, a feed conduit for passing an alkaline solution into said tower to enable said solution to absorb carbon dioxide contained in said combustion products, a vessel, a connection for passing said carbon dioxide-containing solution to said vessel, means for withdrawing solution from the vessel in amounts corresponding to solution entering the tower, said vessel being adapted to be heated by said furnace whereby carbon dioxide, accompanied by some water vapor, is given off, a pipe line for leading said water vapor and carbon dioxide away from said vessel, and for condensing said water vapor while distributing said carbon dioxide, solely under the relatively gentle expansive force of the gases and vapors produced by evaporation in said vessel, in the vicinity of growing plants.

5. An apparatus of the character described, comprising a furnace heated by ignited carbonaceous fuel, an outlet pipe for the products of combustion, an irrigating tower in communication with said outlet pipe, a feed conduit for passing an alkaline solution into said tower to enable said solution to absorb carbon dioxide contained in said combustion products, a vessel, a connection for passing said carbon dioxide-containing solution to said vessel, means for withdrawing solution from the vessel in amounts corresponding to solution entering the tower, said vessel being adapted to be heated by said furnace whereby carbon dioxide, accompanied by some water vapor, is given off, a pipe line for leading said water vapor and carbon dioxide away from said vessel, and for condensing said water vapor while removing from said carbon dioxide impurities contained therein, a tank in communication with said pipe line for collecting said condensation products, means for returning fluid from said tank into the vessel, and means connected with the pipe line for distributing said carbon dioxide, solely under the relatively gentle expansive force of the gases and vapors produced by evaporation in said vessel, in the vicinity of growing plants.

6. An apparatus of the character described, comprising a furnace heated by ignited carbonaceous fuel, an outlet pipe for the products of combustion of said furnace, an irrigating tower in communication with said outlet pipe, a vessel adapted to be heated by said furnace, a feed conduit for passing an alkaline solution from said vessel into said tower to enable the solution to absorb carbon dioxide contained in said combustion products, means for cooling said solution on its way to said tower, means for returning said solution to the vessel after it has passed through said tower, and a discharge conduit leading from a point above the level of the liquid in the vessel and provided with orifices to discharge, in the vicinity of growing plants and solely under the relatively gentle expansive force of the gases and vapors produced by evaporation in said vessel, carbon dioxide produced by the heating of the solution in said vessel.

7. An apparatus of the character described, comprising a furnace heated by ignited carbonaceous fuel, an outlet pipe for the products of combustion of said furnace, an irrigating tower in communication with said outlet pipe, a filter interposed in said outlet pipe between said furnace and said irrigating tower, and adapted to catch impurities passing through said exhaust pipe, a vessel adapted to be heated by said furnace, a feed conduit for passing an alkaline solution from said vessel into said tower to enable the solution to absorb carbon dioxide contained in said combustion products, means for returning said carbon dioxide-containing solution to the vessel, and a discharge conduit leading from a point above the level of the liquid in said vessel and provided with orifices to discharge, in the vicinity of growing plants and solely under the relatively gentle expansive force of the gases and vapors produced by evaporation in said vessel, the carbon dioxide produced by the heating of the solution in said vessel.

8. An apparatus of the character described, comprising a heating plant heated by ignited carbonaceous fuel and a smoke passage for the products of combustion therefrom, a long pipe line leading to the vicinity of growing plants and provided with a plurality of orifices arranged to permit discharge near such plants of carbon dioxide, and, intermediate between said pipe line and said smoke passage, means for conveying carbon dioxide derived from the products of combustion to the pipe line, said means including apparatus within which products of combustion coming from the smoke passage are freed from concomitants injuriously affecting the life and growth of vegetable matter and means for causing the thus purified carbon dioxide on delivery to the long pipe line, to progress continuously through said long pipe line to its discharge orifices as an evenly and gently flowing gas stream, advancing solely under a substantially constant pressure.

In testimony whereof I have hereunto set my hand.

FRIEDRICH RIEDEL.